United States Patent

[11] 3,619,267

| [72] | Inventors | Klaus Weissermel<br>Kelkhein/Taunus;<br>Rudolf Kern, Mainz; Walter Herwig,<br>Frankfurt am Main; Siegfried Breitschaft,<br>Augsburg, all of Germany |
|---|---|---|
| [21] | Appl. No. | 817,570 |
| [22] | Filed | Apr. 18, 1969 |
| [45] | Patented | Nov. 9, 1971 |
| [73] | Assignee | Farbwerke Hoechst Aktiengesellschaft<br>vormals Meister Lucius & Bruning<br>Frankfurt am Main, Germany |
| [32] | Priority | Apr. 12, 1968 |
| [33] | | Germany |
| [31] | | P 18 14 149.6 |

[54] THERMOPLASTIC MOULDING COMPOSITIONS ON THE BASIS OF SATURATED POLYESTERS
10 Claims, No Drawings

[52] U.S. Cl. .................................................. 117/100 C,
117/138.8 F, 117/168

[51] Int. Cl. ..................................................... B32b 27/06,
B32b 27/36

[50] Field of Search .................................................. 117/100 C,
168, 138.8 F, 121; 260/37 CP, 835, 28

[56] References Cited

UNITED STATES PATENTS

| 2,779,745 | 1/1957 | Howland | 117/100 X |
| 2,962,469 | 11/1960 | Phillips et al. | 260/835 |
| 3,180,750 | 4/1965 | Shipee et al. | 260/28 |
| 3,193,601 | 7/1965 | Billingsley | 264/142 |
| 3,245,817 | 4/1966 | Lovness | 117/168 X |
| 3,405,102 | 10/1968 | Kugler et al. | 260/37 |
| 3,461,088 | 8/1969 | Stahnecker et al. | 117/100 X |
| 3,461,092 | 8/1969 | Story | 117/100 X |

FOREIGN PATENTS

| 847,059 | 9/1960 | Great Britain | 117/100 |

*Primary Examiner*—William D. Martin
*Assistant Examiner*—Mathew R. P. Perrone, Jr.
*Attorney*—Curtis, Morris and Safford

ABSTRACT: Thermoplastic moulding compositions on the basis of saturated linear polyesters which comprises coating the polyester granules with neutralized or partially neutralized slats of montan wax or of esters of montan wax.

THERMOPLASTIC MOULDING COMPOSITIONS ON THE BASIS OF SATURATED POLYESTERS

The present invention relates to thermoplastic moulding compositions on the basis of saturated polyesters, which moulding compositions have improved properties.

It has been proposed to produce shaped articles from thermoplastic moulding compositions comprising saturated linear polyesters of aromatic dicarboxylic acids. It has also been proposed to add to polyethylene terephthalate finely divided inorganic substances as nucleating agents to increase the speed of crystallization of the injection moulded polyester in the mould. By this step the crystallinity and the density of the injection moulded articles are increased and therewith the dimensional stability and stability of shape at elevated temperature are improved. As solid inorganic substances there have been proposed, for example metal oxides, alkaline earth metal salts, talc powder, glass powder, or metals. The inorganic substances should have a particle size of less than 2 microns.

It has likewise been proposed further to increase the speed of crystallization by adding to the polyesters a mixture of the inorganic nucleating agents with specific epoxides.

In copending application Ser. No. 817,545 filed concurrently herewith, a process for the manufacture of rapidly crystallizing moulding compositions on the basis of saturated linear polyesters is described in which the polyester mixed with inert inorganic solids and specific epoxides is coated, after the usual after-condensation, with a salt of a montan wax or of a montan wax ester.

By the addition of montan wax salts or salts of montan wax esters to the polyester composition containing inorganic nucleating agents and specific epoxides, the injection cycle can be considerably shortened and therewith the rate of production increased without the utilitarian properties of the polyester being detrimentally affected.

Further experiments have revealed that the aforesaid process can be further simplified.

It has now been found that thermoplastic moulding compositions on the basis of saturated linear polyesters having advantageous properties can be prepared by coating polyester granules having a moisture content below 0.01 percent by weight and a reduced specific viscosity of at least 1.25 dl./g, measured with a 1 percent solution in a 60:40 mixture of phenol and tetrachloroethane at 25° C., with 0.01 to 1 percent by weight, preferably 0.1 to 0.8 percent by weight and more preferably 0.3 to 0.7 percent by weight, calculated on the polyester, of neutral or partially neutralized salts of montan wax or of montan wax esters.

The present process, in which the polyester granules are merely coated with salts of montan wax or of montan wax esters, has a plurality of advantages over the aforesaid processes.

The montanates are better compatible with the polyester than inorganic solids. As the montan wax salts melt during processing they are more finely divided in the polyester and thus more effective. Moreover agglomerates, which may cause flaws when inorganic solids are added and reduce the impact strength of the injection moulded articles, are not formed.

As polyester, polyethylene terephthalate is used in the first place. Other suitable polyesters are, for example poly-cyclohexane-1,4-dimethylol terephthalate or polyesters containing as acid component, in addition to terephthalic acid, up to 5 mole percent of other aromatic or aliphatic dicarboxylic acids, such as isophthalic acid, naphthalene-2,6-dicarboxylic acid or adipic acid, or as alcoholic component, in addition to ethylene glycol, up to 30 mole percent of other aliphatic diols, such as 2,2-dimethylpropane-diol-1,3) or butane-diol-(1,4), or up to 1 percent of tetrols, for example 1,1,4,4-tetramethylol-cyclohexane. Polyesters of hydroxycarboxylic acids may also be used. The polyesters should have a reduced specific viscosity of from 0.6 to 2.0 dl./g., preferably 0.9 to 1.6 dl./g., measured with a 1 percent polymer solution in a 60:40 mixture of phenol and tetrachloroethane at 25° C. Especially good results are obtained with polyesters having a reduced specific viscosity of from 1.1 to 1.5 dl./g.

Montan acid is an acid mixture essentially consisting of aliphatic monocarboxylic acids having 26 to 32 carbon atoms in the chain. Suitable salts of montan wax contain as cation metals of main groups I–III of the Periodic system, preferably Li, Na, K, Be, Mg, Ca, and Al, sodium montanates being preferred. As partially neutralized salts of montan wax there are used salts obtained by reacting montan acid with 0.1 to 1 equivalent of alkali metal hydroxide or alkali metal oxide, preferably salts obtained with 0.25 to 0.9 equivalent of sodium hydroxide.

Salts of montan wax esters that can be used are obtained by partial esterification of montan acids with up to 0.90 equivalent, preferably 0.5 to 0.8 equivalent of dihydric alcohols having two to four carbon atoms in the alkylene group, with subsequent neutralization with oxides or hydroxides of the metals specified above. Especially suitable diols are, for example, ethylene glycol, 1,2-propane-diol, 1,3-propane-diol, 1,3-butane-diol and 1,4-butane-diol.

The desired effect of the salts of montan wax or of montan wax esters as nucleating agent and mould release agent can only be obtained if the finished granules are coated with the said compounds after the usual drying and after-condensation.

By coating the finished polyester granules with the montan wax salt or the salt of a montan wax ester there are obtained not only a rapid crystallization of the moulded article in the mould and better mould release properties, but simultaneously the granules are protected against the absorption of moisture. To obtain unobjectionable injection moulded articles the polyester moulding composition should contain as little moisture as possible, preferably less than 0.01 percent by weight.

In order to bring about crystallization in the mould the mould must be maintained at a temperature of at least 110° C. A rapid crystallization and therewith short injection cycles are obtained with mould temperatures in the range of from 120° to 150° C., preferably of from 135° to 145° C.

Tests were carried out using the injection mould for a program control dial of a washing machine wherein the dial was pressed out of the mould by very sharp ejector pins. The injection cycle was defined after which the ejector pins did just not penetrate into the finished moulded articles and the article fell from the mould almost by itself.

The following examples serve to illustrate the invention but they are not intended to limit it thereto, the percentages are percent by weight, calculated on the polyethylene terephthalate.

EXAMPLE 1

Granules of polyethylene terephthalate having a moisture content of less than 0.01 percent and a reduced specific viscosity of 1.4 dl./g. were rolled for 1 hour with 0.6 percent of sodium montanate.

With the granules obtained program control dials having a diameter of about 10 cm. were injection moulded at a cylinder temperature of 265° C. and a temperature of the mould of 140° C. The total injection cycle was 60 seconds. The residence time in the mould was chosen in such a manner that the ejector pins did not penetrate into the articles when the mould was opened. The injection moulded articles had excellent surface properties, they were free from flashes and had a density of 1.368 g./cc.

EXAMPLE 2

Granules of polyethylene terephthalate having a moisture content of less than 0.01 percent and a reduced specific viscosity of 1.4 dl./g. were rolled for 1 hour together with 0.4 percent of sodium montanate.

With the granules program control dials having a diameter of about 10 cm. were injection moulded at a cylinder temperature of 265° C. and a temperature of the mould of 140° C. The residence time in the mould was chosen in such a manner that the ejector pins did not penetrate into the articles when the mould was opened. The articles had excellent surface properties, they were free from flashes and had a density of 1.368 g./cc.

What is claimed is:

1. A composition consisting essentially of granules of a saturated linear polyester of terephthalic acid and a saturated aliphatic or cycloaliphatic diol, said polyester having a moisture content of less than 0.01 percent by weight and a reduced specific viscosity of at least 1.25 dl./g. measured in a 1 percent solution in a 60:40 mixture of phenol and tetrachlorethane at 25° C., said granules being coated with 0.01 to 1 percent by weight, calculated on the weight of the polyester, of a neutral or partially neutralized salt of montan wax or montan wax ester.

2. The composition of claim 1, wherein the saturated linear polyester is polyethylene terephthalate.

3. The composition of claim 1, wherein the saturated linear polyester is polycyclohexane-1,4-diemthylol terephthalate.

4. The composition of claim 1, wherein the linear saturated polyester contains as acid component, in addition to terephthalic acid, up to 5 mole percent of other aromatic or aliphatic dicarboxylic acids.

5. The composition of claim 2, wherein the polyester contains as diol component, in addition to ethylene glycol, up to 30 mole percent of other aliphatic diols.

6. The composition of claim 1, wherein the neutral or partially neutralized montanate contain a cation metal of main groups I to III of the Periodic Table.

7. The composition of claim 1, wherein the polyester is coated with sodium montanate.

8. The composition of claim 1, wherein the polyester is coated with a partially neutralized salt of montan wax obtained by reacting montan acid with 0.1 to 1 equivalent of alkali metal, hydroxide or alkali metal oxide.

9. The composition of claim 1, wherein the polyester is coated with a partially neutralized salt of montan wax obtained by reacting montan acid with 0.25 to 0.9 equivalent of sodium hydroxide.

10. The composition of claim 1, wherein the polyester is coated with a salt of montan wax ester obtained by partial esterification of montan acid with up to 0.9 equivalent of a dihydric alcohol having two to four carbon atoms in the alkylene group, and subsequent neutralization with an oxide or hydroxide of a metal selected from main Groups I to III of the Periodic Table.

* * * * *

PO-1050
(5/69)

UNITED STATES PATENT OFFICE
CERTIFICATE OF CORRECTION

Patent No. 3,619,267      Dated November 9, 1971

Inventor(s) Weissermel, Kern, Herwig and Breitschaft

It is certified that error appears in the above-identified patent and that said Letters Patent are hereby corrected as shown below:

In the Heading, after "Priority," replace "Apr. 12, 1968" by --Dec. 12, 1968--.

Signed and sealed this 11th day of April 1972.

(SEAL)
Attest:

EDWARD M. FLETCHER, JR.
Attesting Officer

ROBERT GOTTSCHALK
Commissioner of Patents